June 7, 1927.  S. NISTLER  1,631,546
INFANT'S CONVEYANCE
Filed July 31, 1924   2 Sheets-Sheet 1
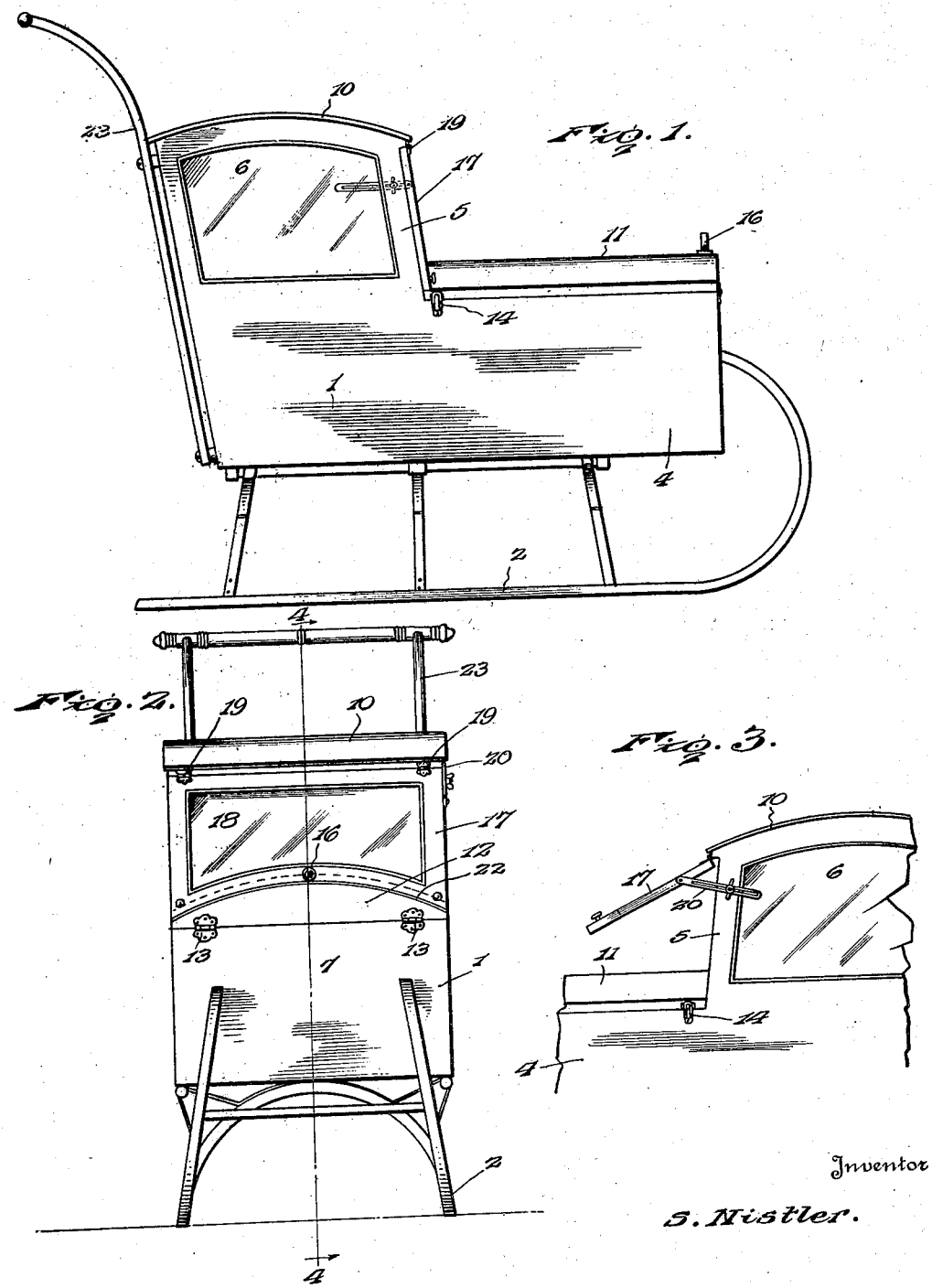
Inventor
S. Nistler.
By Larry Lacey, Attorneys

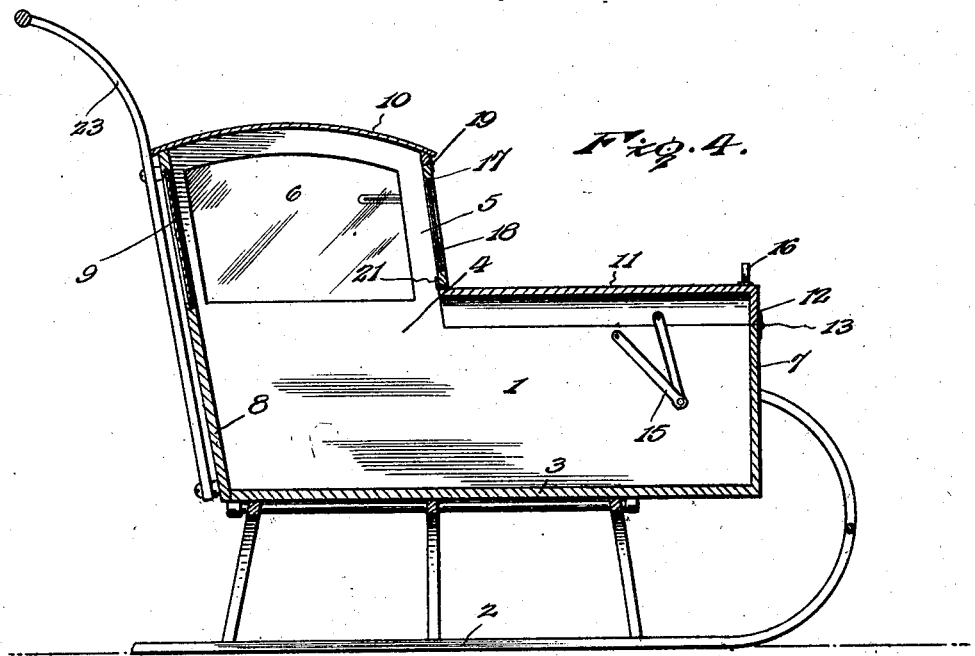
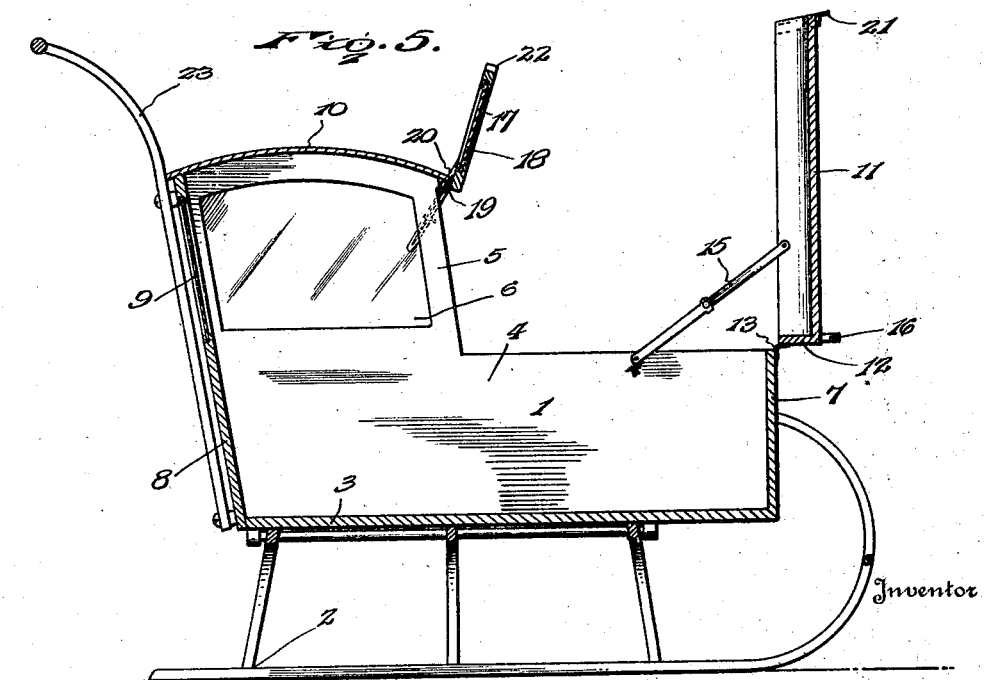

Patented June 7, 1927.

1,631,546

UNITED STATES PATENT OFFICE.

SEBASTIAN NISTLER, OF BUFFALO, NEW YORK.

INFANT'S CONVEYANCE.

Application filed July 31, 1924. Serial No. 729,369.

My invention relates to vehicles for infants and has for its primary object the provision of a vehicle of attractive and novel form which may be used in inclement weather and which will thoroughly protect the child from the elements. The invention also seeks to provide such a vehicle of simple construction which will prevent the child from falling from the vehicle and suffering injury as a consequence, while access to the vehicle may be easily obtained whenever desired so that the placing of the child within the vehicle or removing him therefrom is a very simple proceeding. The invention is illustrated in the accompanying drawings and will be hereinafter fully set forth.

In the drawings:

Figure 1 is a side elevation of one embodiment of my present invention:

Fig. 2 is a front elevation of the same.

Fig. 3 is a detail side elevation showing the side opposite that appearing in Fig. 1;

Fig. 4 is a central longitudinal vertical section on the line 4—4 of Fig. 2, and Fig. 5 is a similar view showing the device arranged to permit the child to be placed therein or removed therefrom.

The body 1 of the vehicle is shown as supported upon runners 2 but it will be understood, of course, that it may be mounted upon wheels. The body comprises a bottom 3 which is secured directly upon the running gear and is preferably of a rectangular oblong form. Side walls 4 are secured to and rise from the bottom 3, and these side walls have their rear portions extended upwardly beyond their forward portions, as shown at 5, the said upwardly extended portions being provided with glazed openings or windows 6, as shown. The front ends of the side walls 4 are connected by a front vertical wall 7 which is preferably imperforate and is rigidly secured to the front end of the bottom 3 and the front ends of the side walls, as will be readily understood, while the rear end of the body is closed by a back wall 8 secured to the rear ends of the bottom and the side walls and extending upwardly coterminous with the upwardly extended portions 5 of the side walls. A window or glazed opening 9 is preferably provided in the upper end portion of the back wall so that the nurse or other person propelling the vehicle may view the occupant at all times. A roof 10 of any suitable durable material is secured upon the upper edges of the back wall and the extensions 5 of the side walls, and this roof is preferably arched, as shown in the drawings, so as to shed rain and also impart a somewhat ornamental appearance to the vehicle. The upper edge of the front wall 7 is flush with the upper edges of the forward portions of the side walls 4, and a cover 11 is provided to extend over the space between the forward portions of the side walls, this cover being preferably arched transversely and provided with a segmental front wall 12 to rest directly upon the upper edge of the front wall 7, hinges 13 being secured to the said members 7 and 12 at the meeting edges thereof so as to connect the cover to the body for swinging movement in a vertical plane. Latches 14 of any preferred form are provided upon the side walls to engage the side edges of the cover and retain the same in its lowered position, while a folding brace 15 is attached to the cover and the side wall to support the cover in the open raised position shown in Fig. 5, as will be understood. To add to the attractiveness of the vehicle, an ornament 16 is mounted upon the cover at the front end of the same, and this ornament is formed to simulate the radiator cap of an automobile or a motor meter. A windshield 17 is provided to extend across the front of the body between the vertical extensions 5 of the side walls, and this shield is preferably glazed, as indicated at 18. The shield is attached to the roof or to the front edges of the extensions 5 by hinges 19, and a brace 20 is preferably provided at one side of the shield to be adjustably held to the adjacent extension 5, as shown most clearly in Fig. 3, so that the shield may be opened in fair weather and permit the infant to obtain the benefit of the fresh air. At the rear edge of the cover 11, I secure a guard rail 21 which extends entirely across the cover and is adapted to fit behind the lower arcuate edge 22 of the shield when the shield is closed so that rain cannot readily work in under the windshield to reach the child occupying the vehicle.

Handle members 23 of any preferred form are secured to the back wall of the vehicle so that a nurse or other attendant may easily push the vehicle over the ground.

From the foregoing description, taken in connection with the accompanying drawings, it will be seen that I have provided a vehicle of simple and inexpensive construction which closely simulates a closed automobile in appearance and by the use of which a young child may be given the benefit of outside air while being thoroughly protected against inclement weather. The cover and the windshield may be easily moved to open position when a child is to be placed in the vehicle or removed therefrom, and when in closed position will thoroughly protect the child against the weather. It is also to be noted that the windshield and the cover interengage so that the cover cannot be opened from the inside of the vehicle and accidental release of the occupant is thus avoided while at the same time freedom of movement is accorded the infant.

Having thus described the invention, I claim:

A child's vehicle comprising a body having a forward extension, a cover closing the forward extension and hinged thereto at its front end to swing upwardly at its rear end to an open position, a rail at the rear end of the cover having an upstanding flange along its rear edge, and a shield closing the front of the body above the forward extension thereof and hinged at its top and adapted to swing forwardly and upwardly at its bottom to an open position and when closed having its lower end portion fitted close against the top face of the rail and front face of the upstanding flange whereby the shield may securely hold the cover closed and the flange of the rail limit closing movement of the shield and form a tight joint between the shield and cover.

In testimony whereof I affix my signature.

SEBASTIAN NISTLER. [L. S.]